United States Patent
Seo et al.

(10) Patent No.: US 7,121,492 B2
(45) Date of Patent: Oct. 17, 2006

(54) REEL COVER OF MAGNETIC RECORDING/REPRODUCING APPARATUS, AND A METHOD OF MANUFACTURING THEREOF

(75) Inventors: Jae-Kab Seo, Suwon-si (KR); Jeong-Hyeob Oh, Anyang-si (KR); Jae-Hoon Sim, Suwon-si (KR); Byeng-Bae Park, Aansan-si (KR); Seung-Woo Lee, Suwon-si (KR); Hyeong-Seok Choi, Suwon-si (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 11/110,793

(22) Filed: Apr. 21, 2005

(65) Prior Publication Data

US 2006/0163404 A1     Jul. 27, 2006

(30) Foreign Application Priority Data

Jun. 17, 2004   (KR)   ...................... 10-2004-0044840

(51) Int. Cl.
*G11B 23/04*   (2006.01)
(52) U.S. Cl. ....................................... 242/340; 360/96.1
(58) Field of Classification Search ................ 242/335, 242/338, 340, 341, 342; 360/85, 96.1, 96.5
See application file for complete search history.

(56) References Cited

U.S. PATENT DOCUMENTS 5,774,300 A * 6/1998 Eum .......................... 360/85
5,782,421 A * 7/1998 Kletzl et al. ................. 242/340
6,449,118 B1 * 9/2002 Choi et al. .................... 360/85
7,038,879 B1 * 5/2006 Kim et al. .................. 360/96.1
2005/0280926 A1 * 12/2005 Seo et al. ...................... 360/85

FOREIGN PATENT DOCUMENTS

| EP | 1 607 956 | * 12/2005 |
| JP | 2006-004607 | * 1/2006 |
| KR | 10-0243794 | 12/1996 |
| KR | 10-0412507 | 8/2003 |

* cited by examiner

*Primary Examiner*—William A. Rivera
(74) *Attorney, Agent, or Firm*—Roylance, Abrams, Berdo & Goodman, LLP

(57) ABSTRACT

A reel cover of a magnetic recording/reproducing apparatus having an improved assembly construction with respect to a chassis and a method of manufacturing thereof provide a reel cover assembled with the chassis in a manner where a plurality of protrusions of a reel cover body are inserted in a plurality of recesses formed on the chassis. In this state, a resilient member formed at the reel cover body resiliently contacts a side surface of the chassis so that the protrusions are kept within the recesses. The reel cover can be assembled with the chassis in a simple manner without requiring extra securing means such as screws. Accordingly, the number of assembly parts can be decreased and the assembly procedure may be simplified, thereby productivity may be improved and manufacturing cost may be reduced.

14 Claims, 4 Drawing Sheets

REEL COVER OF MAGNETIC RECORDING/REPRODUCING APPARATUS, AND A METHOD OF MANUFACTURING THEREOF

CROSS-REFERENCE TO RELATED APPLICATIONS

This application claims the benefit under 35 U.S.C. §119 (a) of Korean Patent Application No. 2004-44840, filed on Jun. 17, 2004, in the Korean Intellectual Property Office, the entire disclosure of which is hereby incorporated by reference.

BACKGROUND OF THE INVENTION

1. Field of the Invention

The present invention relates to a deck assembly of a magnetic recording/reproducing apparatus, and more particularly, to a reel cover which is assembled with a chassis for firmly securing an idle gear assembly for the driving of a tape cassette-mounted reel table, from moving out of a normal position.

2. Description of the Related Art

A magnetic recording/reproducing apparatus records video and audio data on a recording medium such as a magnetic tape and reproduces the data from the recording medium. Examples of magnetic recording/reproducing apparatuses include VCRs (Video Cassette tape Recorders) and camcorders.

FIG. 1 is a schematic view showing a deck of a general magnetic recording/reproducing apparatus.

Referring to FIG. 1, the deck of the general magnetic recording/reproducing apparatus comprises a main chassis 10 and a sub-chassis 20. A head drum 11, a capstan motor 12, a loading motor 13 and tape running guide means including a plurality of guide rollers 14 and a guide pole 15 are located on the main chassis 10.

The sub-chassis 20 is slidably disposed on the main chassis 10. A pair of reel tables 21 and 22 on which a tape cassette is mounted, an idle gear assembly 23 for selectively transmitting a driving force from the capstan motor 12 to the reel tables 21 and 22, and a reel cover 30 for supporting the idle gear assembly 23 are located on the sub-chassis 20.

The reel cover 30 is assembled with the sub-chassis 20 by a plurality of screws 31, for firmly securing the idle gear assembly 23 from moving out of a normal position.

However, because the reel cover 30 is assembled with the sub-chassis 20 by the plurality of screws 31, the deck of the conventional magnetic recording/reproducing apparatus has a problem that the number of assembly parts is inevitably increased and the assembly procedure is complicated. Consequently, production decreases and cost manufacturing cost increases. Especially, in the case of a compact-sized magnetic recording/reproducing apparatus, it does not have a competitive productivity or price due to the additional securing means such as screws.

SUMMARY OF THE INVENTION

The present invention has been developed to address at least the above problems in the related art. Accordingly, an aspect of the present invention is to provide a reel cover of a magnetic recording/reproducing apparatus, which is capable of being assembled with a chassis in a simple manner without requiring separate securing means such as a screw.

The above aspect is achieved by providing, inter alia, a reel cover employed in a magnetic recording/reproducing apparatus. The magnetic recording/reproducing apparatus comprises: a chassis; a pair of reel tables rotatably disposed on the chassis, for mounting a tape reel of a tape cassette thereon; and an idle gear assembly disposed on the chassis and between the reel tables, for selectively transmitting a driving force to the reel tables. The reel cover of the magnetic recording/reproducing apparatus is for, inter alia, firmly securing the idle gear assembly from moving out of a normal position, and comprises: a reel cover body placed on the chassis for supporting the idle gear assembly and having a shaft supporting recess defined therein, in which a shaft of the idle gear assembly is received, and a plurality of protrusions defined thereon to be fitted in and supported by a plurality of recesses protrusively formed on positions of the chassis where the idle gear assembly is placed; and a resilient member for resiliently supporting the reel cover body to keep the protrusions from moving out of the recesses.

According to another aspect of the invention, the resilient member may be formed integrally with the reel cover body and have a pair of resilient flanks resiliently contacting a side surface of the chassis.

According to yet another aspect of the invention, the reel cover body and the resilient member may be formed of plastic material.

According to yet another aspect of the invention, the reel cover body may have a release protrusion for releasing a magnetic tape of a tape cassette mounted on the reel tables from a locking state.

According to yet another aspect of the invention, the release protrusion may be formed integrally with the reel cover body by plastic injection molding.

Sill further aspect of the invention provides a method of manufacturing a reel cover employed in a magnetic recording/reproducing apparatus which includes a chassis; a pair of reel tables rotatably disposed on the chassis, for mounting a tape reel of a tape cassette thereon; and an idle gear assembly disposed on the chassis and between the reel tables, for selectively transmitting a driving force to the reel tables. The method of manufacturing the reel cover of the magnetic recording/reproducing apparatus comprises forming a reel cover body for placement on the chassis for supporting the idle gear assembly, defining a shaft supporting recess in the reel cover in which a shaft of the idle gear assembly is received, and defining a plurality of protrusions on the reel cover body to be fitted in and supported by a plurality of recesses protrusively formed in positions of the chassis where the idle gear assembly is placed; and forming a resilient member for resiliently supporting the reel cover body to keep the protrusions from moving out of the recesses.

Still further aspect of the invention provides a method of manufacturing a magnetic recording/reproducing apparatus, and comprises: forming a chassis including a plurality of recesses; forming a pair of reel tables rotatably disposed on the chassis, for mounting a tape reel of a tape cassette thereon; forming an idle gear assembly disposed on the chassis and between the reel tables, for selectively transmitting a driving force to the reel tables; forming a shaft for supporting the idle gear assembly; forming a reel cover body placed on the chassis for supporting the idle gear assembly, and having a shaft supporting recess defined therein, in which the shaft of the idle gear assembly is received, and a plurality of protrusions defined thereon to be fitted in and supported by the plurality of recesses; and forming a resilient member for resiliently supporting the reel cover body to keep the protrusions from moving out of the recesses.

BRIEF DESCRIPTION OF THE DRAWING FIGURES

The above aspects and other advantages of the present invention will be more apparent by describing an exemplary embodiment of the present invention with reference to the accompanying drawing figures, in which.

Throughout the drawing figures, it will be understood that like reference numerals refer to like elements, features and structures.

DETAILED DESCRIPTION OF EXEMPLARY EMBODIMENTS

Hereinafter, exemplary embodiments of the present invention will be explained in detail with reference to the accompanying drawing figures.

Figure 1:
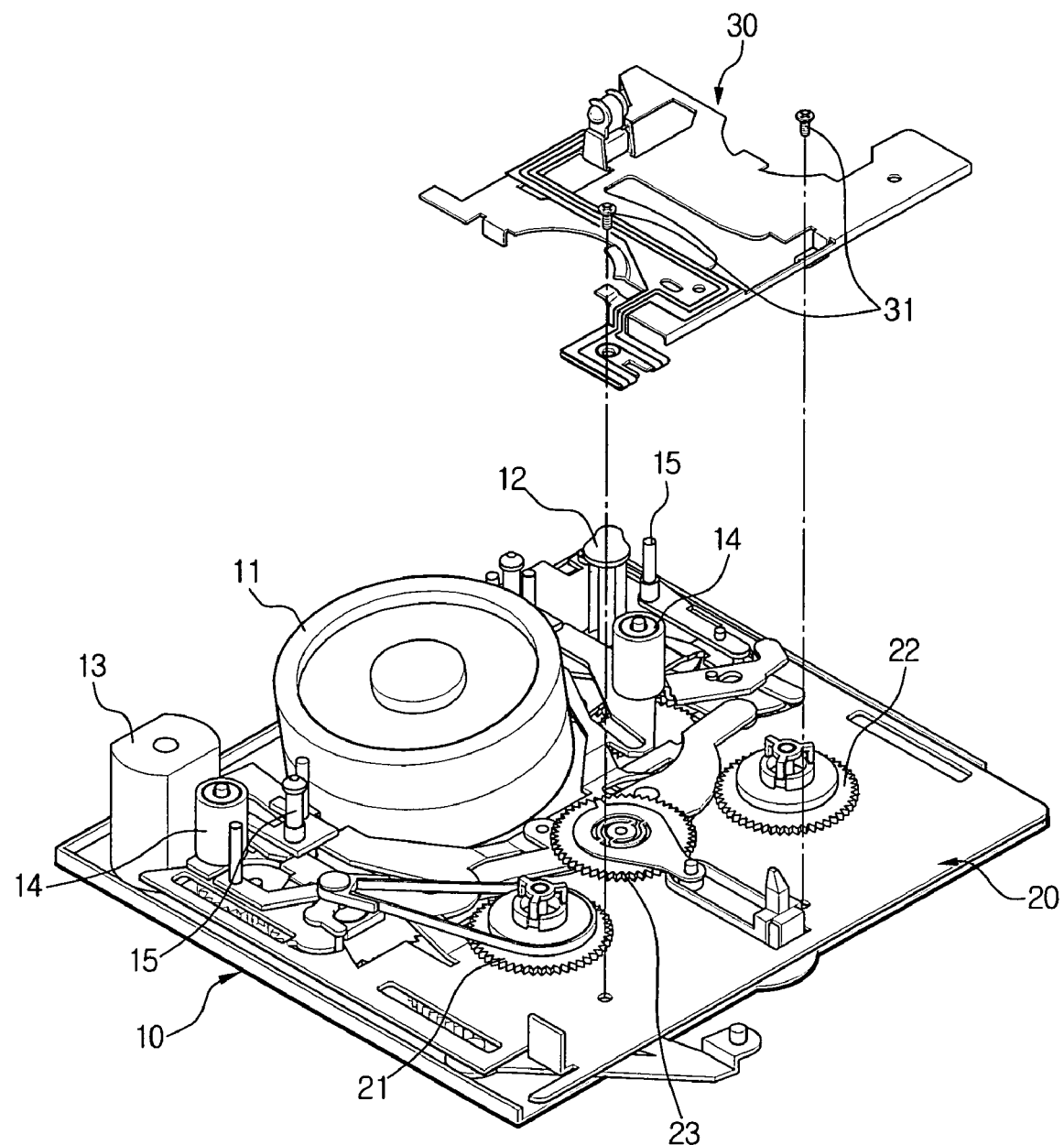
FIG. 1 is a perspective view showing a deck of a general magnetic recording/reproducing apparatus.
Figure 2:
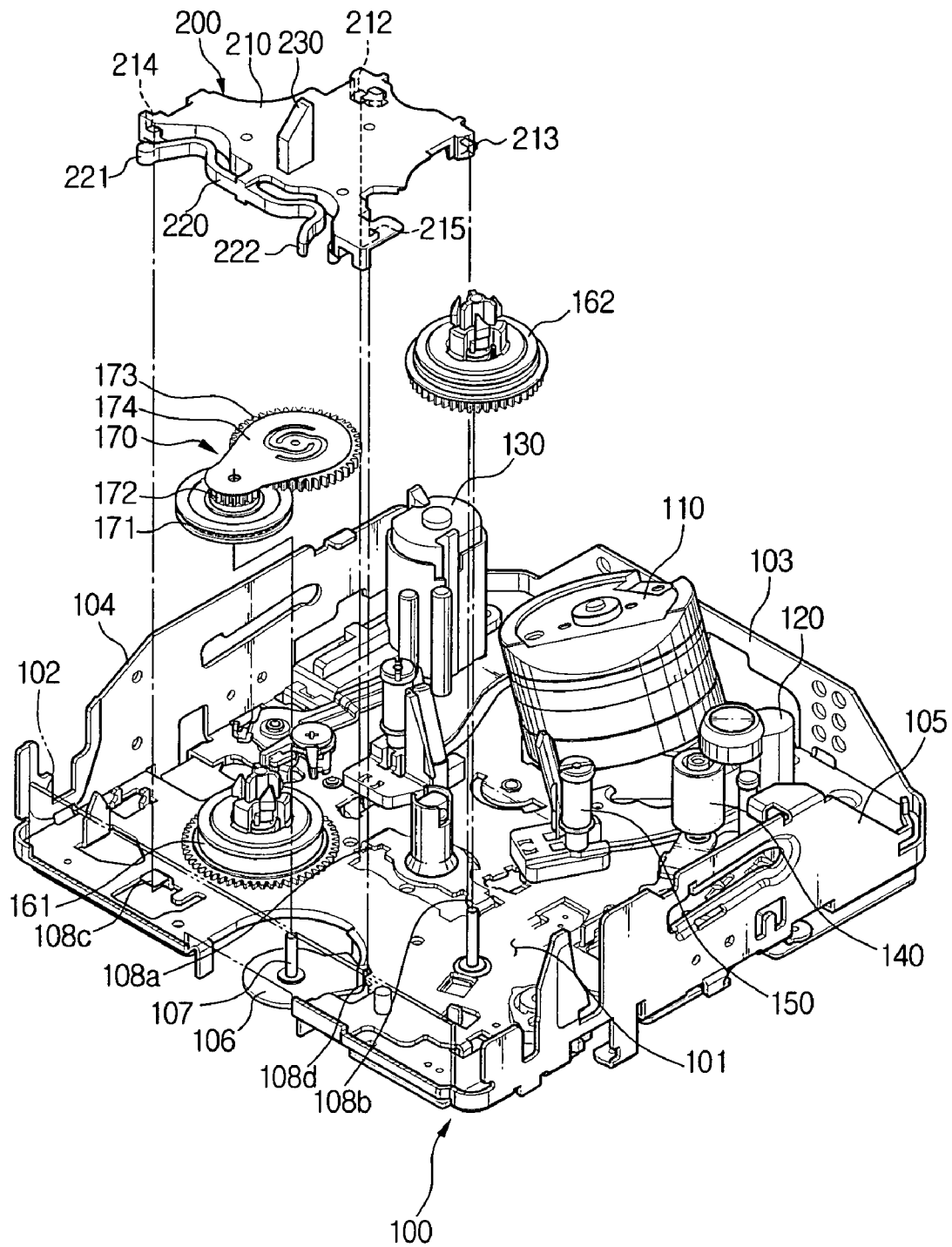
FIG. 2 is a perspective view showing a deck employing a reel cover according to an embodiment of the present invention.
Figure 3:
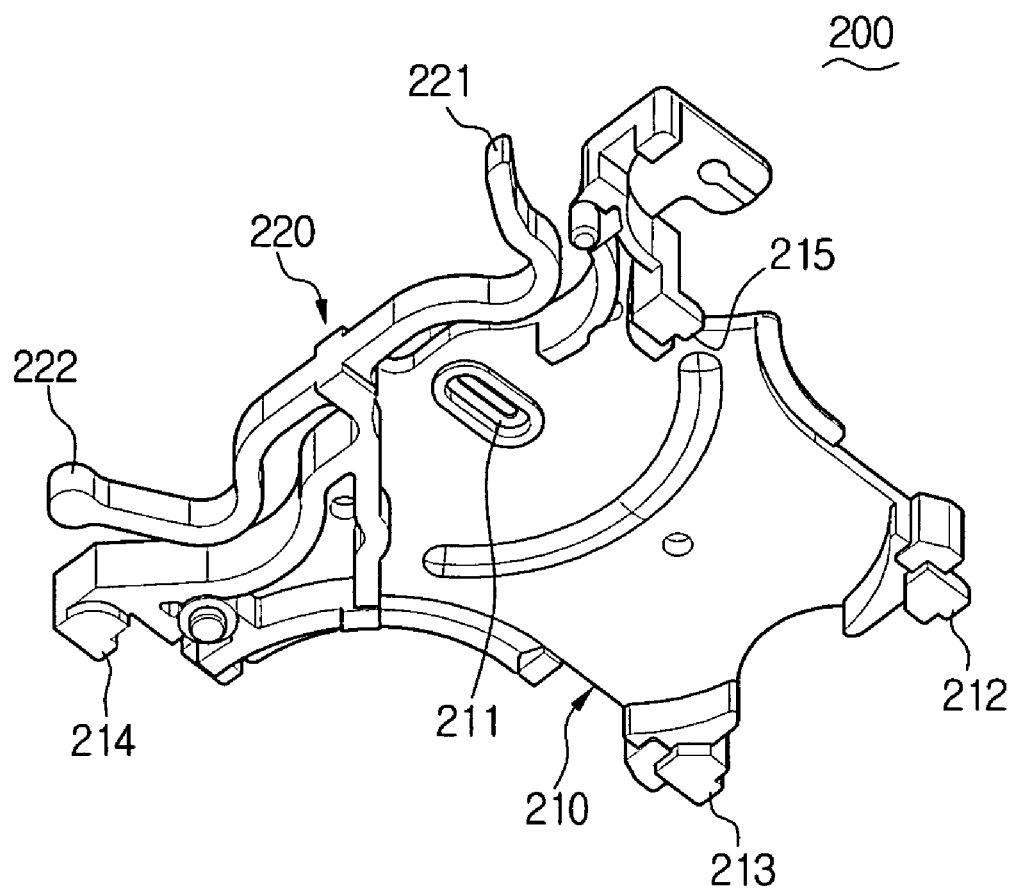
FIG. 3 is a bottom view showing the reel cover of FIG. 2.

FIG. 2 is a perspective view showing a deck of a magnetic recording/reproducing apparatus employing a reel cover according to an embodiment of the present invention, and FIG. 3 is a bottom view showing the reel cover of FIG. 2. Referring to FIGS. 2 and 3, the deck comprises a chassis 100 and a reel cover 200.

As shown in FIG. 2, the chassis 100 comprises a bottom surface 101 and four side surfaces 102 to 105 upwardly extending from the bottom surface 101.

Ahead drum 110, a capstan motor 120, a loading motor 130 and tape running guide means including a guide roller 140 and a guide pole 150 are located on the bottom surface 101 of the chassis 100.

A pair of reel tables 161 and 162 are rotatably disposed on the bottom surface 101 of the chassis 100, and a tape cassette (not shown) is mounted on the reel tables 161 and 162. An idle gear assembly 170 is also disposed on the bottom surface 101 of the chassis 100, for selectively transmitting a driving force from the capstan motor 120 to the reel tables 161 and 162.

The idle gear assembly 170 is engaged with a shaft 107 of a gear sheet 106 provided between the reel tables 161 and 162 and at the bottom surface 101 of the chassis 100. An idle pulley 171 of the idle gear assembly 170 is connected with the capstan motor 120 through a belt (not shown), and a first idle gear 172 and a second idle gear 173 are engaged with each other through an arm 174. The second idle gear 173 swings according to a rotational direction of the first idle gear 172 to be engaged with the reel tables 161 and 162, selectively, so that the reel tables 161 and 161 are selectively driven.

The reel cover 200 is located on the bottom surface 101 of the chassis 100 and between the reel tables 161 and 162, for firmly securing the idle gear assembly 170 from moving out of a normal position.

As shown in FIGS. 2 and 3, the reel cover 200 comprises a reel cover body 210 and a resilient member 220.

The reel cover body 210 has a shaft supporting recess 211 (see FIG. 3) defined therein for receiving and supporting the shaft 107 of the idle gear assembly 170 and a plurality of protrusions 212 to 215 defined thereon for the assembly with the chassis 100. The shaft supporting recess 211 has a substantially oval shape to enable the reel cover 200 to move as much as the length of the shaft supporting recess 211 when being assembled with or disassembled from the chassis 100.

The plurality of protrusions 212 to 215 are fitted in and held by a plurality of recesses 108a to 108d formed in predetermined positions of the bottom surface 101 of the chassis 100, which correspond to assembly positions of the reel cover 200 between the reel tables 161 and 162. The recesses 108a to 108d each have at least one opening through which front ends of the protrusions 212 to 215 are inserted in and held by the recesses 108a to 108d.

The resilient member 220 is formed on the reel cover body 210 for resiliently supporting the reel cover body 210 to keep the protrusions 212 to 215 of the reel cover body 210 from moving out of the recesses 108a to 108d.

Figure 4:
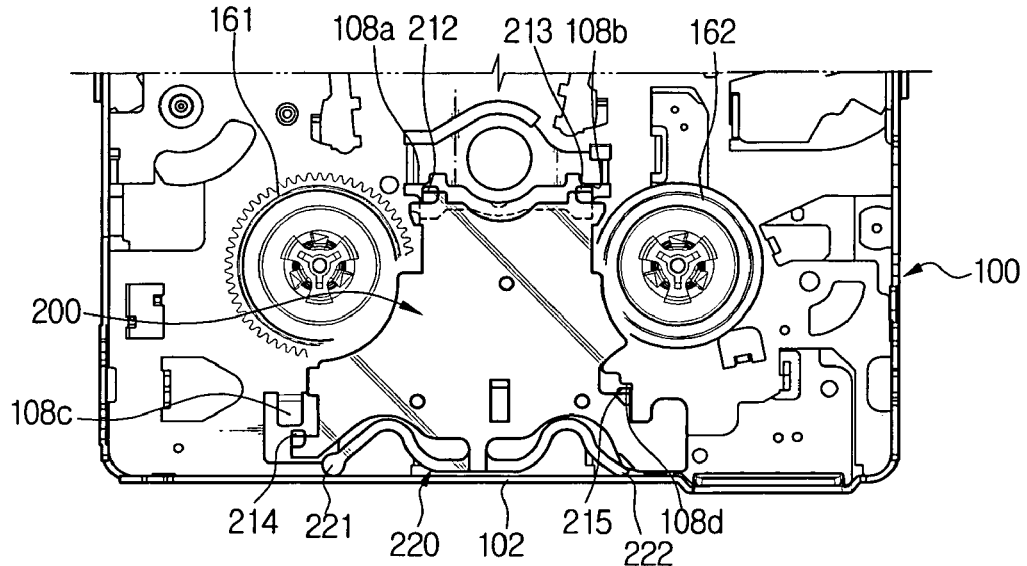
FIGS. 4 and 5 are views respectively showing an example of the reel cover and the chassis before and after the assembling.
Figure 5:
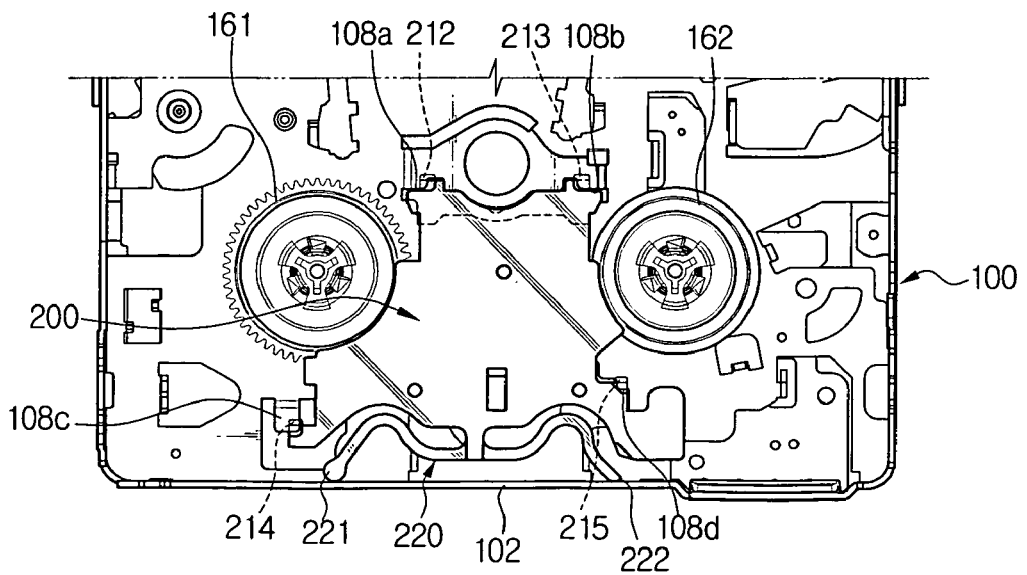

As shown in FIGS. 4 and 5, the resilient member 220 comprises a pair of resilient flanks 221 and 222 resiliently contacting the side surface 102 of the chassis 100. The reel cover body 210 is resiliently supported on the resilient flanks 221 and 222 due to a recovering force so that that the protrusions 212 to 215 do not move out of the recesses 108a to 108d.

The reel cover body 210 may be formed integrally with the resilient member 220 by plastic injection molding. The reel cover body 210 may have a release protrusion 230 formed thereon for releasing a magnetic tape of the tape cassette (not shown) mounted on the reel tables 161 and 162 from a locking state. The release protrusion 230 may be formed integrally with the reel cover body 210 by plastic injection molding.

FIGS. 4 and 5 are views respectively showing the reel cover 200 and the chassis 100 before and after the assembling. With reference to FIGS. 4 and 5, the assembling of the reel cover will be described.

The reel cover 200 is placed on the chassis 100 in so a manner that the protrusions 212 to 215 of the reel cover 200 are adjacent to the corresponding recesses 108a to 108d of the chassis 100. At this time, the resilient flanks 221 and 222 of the resilient member 220 are deformed in contact with the side surface 102 of the chassis 100 (see FIG. 4). Accordingly, the protrusions 212 to 215 can be positioned in proper positions to be fitted in the recesses 108a to 108d.

In a state where the reel cover 200 is placed in a proper position in order for the protrusions 212 to 215 to be inserted into the recesses 108a to 108d, when an external force is removed, the protrusions 212 to 215 are firmly fitted in the recesses 108a to 108d due to a recovering force of the resilient member 220.

Meanwhile, an upper end of the shaft 107 formed on the gear sheet 106 for rotatably supporting the idle gear assembly 170 is received in the shaft supporting recess 211 formed in the reel cover 200 assembled as above, so that the idle gear assembly 170 is prevented from moving out of a normal position.

As described above, the reel cover 200 can be assembled with the chassis 100 without requiring separate securing means and only by using the protrusions 212 to 215 and the resilient member 220.

According to the present invention, since the reel cover 200 is assembled with the chassis 100 in the simple manner as described above, the number of assembly parts can be decreased and the assembly procedure simplified. Accordingly, the productivity may be improved and the manufacturing cost decreased.

The foregoing embodiment and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A reel cover for securing an idle gear assembly disposed on a chassis of a magnetic recording/reproducing apparatus, the real cover comprising:
   a reel cover body placed on the chassis for supporting the idle gear assembly;
   a shaft supporting recess in which a shaft of the idle gear assembly is received;
   a plurality of protrusions positioned to be fitted in and supported by a plurality of recesses protrusively formed on positions of the chassis where the idle gear assembly is placed; and
   a resilient member positioned to resiliently support the reel cover body urging the protrusions to remain within the recesses.

2. The reel cover as claimed in claim 1, wherein the resilient member is formed integrally with the reel cover body, the resilient member comprising at least two resilient flanks resiliently contacting a side surface of the chassis.

3. The reel cover as claimed in claim 2, wherein the reel cover body and the resilient member comprise a plastic material.

4. The reel cover as claimed in claim 1, wherein the reel cover body comprises a release protrusion for releasing a magnetic tape of a tape cassette mounted on reel tables rotatably disposed on the chassis from a locking state.

5. The reel cover as claimed in claim 4, wherein the release protrusion is formed integrally with the reel cover body by plastic injection molding.

6. A magnetic recording/reproducing apparatus comprising:
   a chassis comprising a plurality of recesses;
   a pair of reel tables rotatably disposed on the chassis, for mounting a tape reel of a tape cassette thereon;
   an idle gear assembly disposed on the chassis and between the reel tables, for selectively transmitting a driving force to the reel tables;
   a shaft for supporting the idle gear assembly;
   a reel cover body placed on the chassis for supporting the idle gear assembly, the reel cover body comprising a shaft supporting recess and a plurality of protrusions, wherein the shaft of the idle gear assembly is received in the recess, and the plurality of protrusions are fitted in and supported by the plurality of recesses; and
   a resilient member positioned to resiliently support the reel cover body urging the protrusions to remain within the recesses.

7. The magnetic recording/reproducing apparatus as claimed in claim 6, wherein the resilient member is formed integrally with the reel cover body and comprises at least two resilient flanks resiliently contacting a side surface of the chassis.

8. A method of manufacturing a reel cover for securing an idle gear assembly disposed on a chassis of a magnetic recording/reproducing apparatus, the method comprising:
   forming a reel cover body configured for placement on the chassis to support the idle gear assembly;
   forming in the real cover body a shaft supporting recess configured to receive a shaft of the idle gear assembly;
   forming a plurality of protrusions positioned on the reel cover body to be fitted in and supported by a plurality of recesses protrusively formed on positions of the chassis where the idle gear assembly is placed; and
   forming a resilient member configured to be positioned to resiliently support the reel cover body urging the protrusions to remain within the recesses.

9. The method as claimed in claim 8, wherein the resilient member is formed integrally with the reel cover body, the resilient member comprising at least two resilient flanks configured to resiliently contact a side surface of the chassis.

10. The method as claimed in claim 9, wherein the reel cover body and the resilient member comprise a plastic material.

11. The method as claimed in claim 8, further comprising forming a release protrusion on the reel cover body, wherein the release protrusion is configured to release a magnetic tape of a tape cassette mounted on reel tables rotatably disposed on the chassis from a locking state.

12. The method as claimed in claim 11, wherein the release protrusion is formed integrally with the reel cover body by plastic injection molding.

13. A method of manufacturing a magnetic recording/reproducing apparatus, the method comprising:
   forming a chassis comprising a plurality of recesses;
   rotatably disposing a pair of reel tables on the chassis for mounting a tape reel of a tape cassette thereon;
   disposing an idle gear assembly on the chassis and between the reel tables, for selectively transmitting a driving force to the reel tables;
   forming a shaft for supporting the idle gear assembly;
   placing a reel cover body on the chassis for supporting the idle gear assembly, the reel cover body comprising a shaft supporting recess and a plurality of protrusions, wherein the shaft of the idle gear assembly is received in the recess, and the plurality of protrusions are fitted in and supported by the plurality of recesses; and
   positioning a resilient member to resiliently support the reel cover body urging the protrusions to remain within the recesses.

14. The method as claimed in claim 13, wherein the resilient member is formed integrally with the reel cover body and comprises at least two resilient flanks resiliently contacting a side surface of the chassis.

* * * * *